United States Patent
Tooher et al.

(10) Patent No.: US 12,289,741 B2
(45) Date of Patent: *Apr. 29, 2025

(54) METHODS FOR PHYSICAL DOWNLINK CONTROL CHANNEL (PDCCH) CANDIDATE DETERMINATION

(71) Applicant: InterDigital Patent Holdings, Inc., Wilmington, DE (US)

(72) Inventors: J. Patrick Tooher, Montreal (CA); Paul Marinier, Brossard (CA); Aata El Hamss, Laval (CA); Ghyslain Pelletier, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/524,176

(22) Filed: Nov. 30, 2023

(65) Prior Publication Data

US 2024/0107549 A1    Mar. 28, 2024

Related U.S. Application Data

(63) Continuation of application No. 17/985,576, filed on Nov. 11, 2022, now Pat. No. 11,877,296, which is a
(Continued)

(51) Int. Cl.
*H04W 72/512* (2023.01)
*H04L 5/00* (2006.01)
(Continued)

(52) U.S. Cl.
CPC .......... *H04W 72/23* (2023.01); *H04L 5/0053* (2013.01); *H04W 72/0446* (2013.01); *H04W 72/566* (2023.01)

(58) Field of Classification Search
CPC ............. H04W 72/23; H04W 72/0446; H04W 72/566; H04W 4/70; H04L 5/0053
See application file for complete search history.

(56) References Cited

U.S. PATENT DOCUMENTS

| | | |
|---|---|---|
| 8,634,374 B2 | 1/2014 | Yang et al. |
| 9,445,413 B2 | 9/2016 | Seo et al. |
| (Continued) | | |

FOREIGN PATENT DOCUMENTS

| | | |
|---|---|---|
| CN | 102804891 A | 11/2012 |
| CN | 103220071 A | 7/2013 |
| (Continued) | | |

OTHER PUBLICATIONS

3GPP TSG RAN WG2#120, R2-2211105, Title: LS to RAN2 on two overlapping LTE-CRS patterns in Rel-18 DSS (Year: 2022).*
(Continued)

*Primary Examiner* — Christopher M Crutchfield
*Assistant Examiner* — Abusayeed M Haque
(74) *Attorney, Agent, or Firm* — Flaster Greenberg, P.C.

(57) ABSTRACT

A wireless transmit/receive unit (WTRU) determines PDCCH candidates. For a slot, the WTRU determines a number of valid PDCCH candidates associated with at least one search space based on a number of designated search spaces associated with the WTRU in the slot, a type of the search space, a priority associated with the search space, a number of required CCE channel estimates associated with the search space, a maximum number of PDCCH candidates in a slot, and a number of control resource sets (CORESETs) associated with the slot. The WTRU may then attempt to decode CCEs in the at least one search space to recover a PDCCH associated with the WTRU. The WTRU may drop PDCCH candidates from the search space when the number of PDCCH exceeds a maximum value.

20 Claims, 8 Drawing Sheets

Related U.S. Application Data continuation of application No. 16/763,454, filed as application No. PCT/US2018/060894 on Nov. 14, 2018, now Pat. No. 11,553,469.

(60) Provisional application No. 62/615,787, filed on Jan. 10, 2018, provisional application No. 62/585,992, filed on Nov. 14, 2017.

(51) Int. Cl.
| | | |
|---|---|---|
| *H04W 72/0446* | (2023.01) | |
| *H04W 72/23* | (2023.01) | |
| *H04W 72/40* | (2023.01) | |
| *H04W 72/566* | (2023.01) | |

(56) References Cited

U.S. PATENT DOCUMENTS

| | | | |
|---|---|---|---|
| 10,028,266 | B2 | 7/2018 | Seo et al. |
| 10,588,127 | B2 | 3/2020 | Moulsley et al. |
| 10,638,457 | B2 | 4/2020 | Lee et al. |
| 11,483,094 | B2 | 10/2022 | Ma et al. |
| 11,553,469 | B2 | 1/2023 | Tooher et al. |
| 11,877,296 | B2 * | 1/2024 | Tooher ............... H04W 72/566 |
| 2011/0261768 | A1 * | 10/2011 | Luo ................... H04L 5/0055 370/329 |
| 2011/0267967 | A1 * | 11/2011 | Ratasuk .............. H04L 5/0053 370/252 |
| 2012/0252447 | A1 * | 10/2012 | Sartori ................ H04W 24/10 455/434 |
| 2013/0083750 | A1 * | 4/2013 | Nazar .................. H04L 1/1861 370/329 |
| 2013/0088972 | A1 | 4/2013 | Kim et al. |
| 2013/0155868 | A1 | 6/2013 | Seo et al. |
| 2013/0215853 | A1 | 8/2013 | Li et al. |
| 2014/0133331 | A1 | 5/2014 | Fu et al. |
| 2014/0133367 | A1 | 5/2014 | Chen et al. |
| 2014/0301330 | A1 | 10/2014 | Lee et al. |
| 2015/0117353 | A1 | 4/2015 | Takeda et al. |
| 2015/0282129 | A1 | 10/2015 | Takeda et al. |
| 2017/0126358 | A1 * | 5/2017 | Rong .................. H04L 1/0046 |
| 2017/0135084 | A1 * | 5/2017 | Kuchibhotla ......... H04L 5/0007 |
| 2017/0223670 | A1 | 8/2017 | Chen et al. |
| 2017/0223687 | A1 * | 8/2017 | Kuchibhotla ......... H04L 5/0007 |
| 2017/0332365 | A1 | 11/2017 | Lin et al. |
| 2017/0332397 | A1 | 11/2017 | Li et al. |
| 2018/0092051 | A1 | 3/2018 | Dinan et al. |
| 2018/0132211 | A1 | 5/2018 | Huang |
| 2018/0132243 | A1 | 5/2018 | Yang et al. |
| 2018/0198594 | A1 | 7/2018 | Tiirola et al. |
| 2018/0227922 | A1 | 8/2018 | Lee et al. |
| 2018/0287742 | A1 | 10/2018 | Feng |
| 2019/0037540 | A1 | 1/2019 | Seo et al. |
| 2019/0181991 | A1 | 6/2019 | Andgart et al. |
| 2019/0297601 | A1 | 9/2019 | You et al. |
| 2019/0306847 | A1 | 10/2019 | Seo et al. |
| 2020/0204294 | A1 | 6/2020 | Ma et al. |
| 2020/0220691 | A1 | 7/2020 | Gao et al. |
| 2021/0144714 | A1 | 5/2021 | Takeda et al. |
| 2022/0030568 | A1 | 1/2022 | Behravan et al. |

FOREIGN PATENT DOCUMENTS

| | | |
|---|---|---|
| CN | 107257275 A | 10/2017 |
| JP | 2015516729 A | 6/2015 |
| JP | 2020533834 A | 11/2020 |
| RU | 2505945 C1 | 1/2014 |
| WO | WO 2013/007016 A1 | 1/2013 |
| WO | WO 2017160100 A2 | 9/2017 |

OTHER PUBLICATIONS

3GPP TSG RAN WG1 Meeting#69bis, R1-113039, Title:Common Search Space for RACH on SCell (Year: 2011).*

Third Generation Partnership Project (3GPP), "Timing Aspects in MAC", InterDigital Inc., 3GPP TSG-RAN WG2 #99bis, Prague, Czech Republic, Oct. 9-13, 2017, R2-1710655, 6 pages.

Kie, Cong, "Research of carrier aggregation of LTE—the advanced system in downlink physical layer", Popular Science & Technology, vol. 15, No. _ 9, Sep. 13, 2020.

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHz, IEEE Std 802.11ac-2013 (Dec. 11, 2013).

IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).

IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE 802.11ah-2016 (Dec. 7, 2016).

Interdigital Inc., "On remaining issues of search space," 3GPP TSG RAN WG1 Meeting #92, R1-1802622, Athens, Greece (Feb. 26-Mar. 2, 2018).

Interdigital Inc., "On remaining issues of search space," 3GPP TSG RAN WG1 Meeting #92bis, R1-1804848, Sanya, China (Apr. 16-20, 2018).

Interdigital Inc., "On remaining issues of search spaces and blind detection," 3GPP TSG RAN WG1 Meeting AH 1801, R1-1800631, Vancouver, Canada (Jan. 22-26, 2018).

Third Generation Partnership Project, "Technical Specification Group Radio Access Network; NR; Physical channels and modulation (Release 15)," 3GPP TS 38.211 V1.0.0 (Sep. 2017).

Third Generation Partnership Project, "Technical Specification Group Radio Access Network; NR; Physical channels and modulation (Release 15)," 3GPP TS 38.211 V15.3.0 (Sep. 2018).

Third Generation Partnership Project, "Technical Specification Group Radio Access Network; NR; Physical layer procedures for control (Release 15)," 3GPP TS 38.213 V1.0.0 (Sep. 2017).

Third Generation Partnership Project, "Technical Specification Group Radio Access Network; NR; Physical layer procedures for control (Release 15)," 3GPP TS 38.213 V15.3.0 (Sep. 2018).

Third Generation Partnership Project, "Technical Specification Group Radio Access Network; NR; NR and NG-RAN Overall Description; Stage 2 (Release 15)," 3GPP TS 38.300 V15.3.1 (Oct. 2018).

Third Generation Partnership Project, "Technical Specification Group Radio Access Network; NR; NR and NG-RAN Overall Description; Stage 2 (Release 15)," 3GPP TS 38.300 V1.0.1 (Oct. 2017).

Third Generation Partnership Project (3GPP), "On Reducing the PDCCH Channel Estimation and BD Complexity in NR", Nokia, 3GPP TSG WG 1 Ad Hoc 1801, Vancouver, CA, Jan. 2018, R1-1800550, 14 pages.

Third Generation Partnership Project (3GPP), 3GPP [90b-NR-22] Email discussion on the UE capability for the number of PDCCH BDs, Fred Takeda, 1 page.

Third Generation Partnership Project (3GPP), 3GPP [90b-NR-22] Email discussion on the UE capability for the number of PDCCH BDs, Fred Takeda, 24 pages.

(56) References Cited

OTHER PUBLICATIONS

Third Generation Partnership Project (3GPP), 3GPP [90b-NR-22] Email discussion on the UE capability for the number of PDCCH BDs, Kazuki Takeda, 24 pages.
Third Generation Partnership Project (3GPP), 3GPP [90b-NR-22] Email discussion on the UE capability for the number of PDCCH BDs, Karol Schober, 25 pages.
Third Generation Partnership Project (3GPP), 3GPP [90b-NR-22] Email discussion on the UE capability for the number of PDCCH BDs, Tony Ekpenyong, 26 pages.
Third Generation Partnership Project (3GPP), 3GPP [90b-NR-22] Email discussion on the UE capability for the number of PDCCH BDs, Wanshi Chen, 26 pages.
Third Generation Partnership Project (3GPP), 3GPP [90b-NR-22] Email discussion on the UE capability for the number of PDCCH BDs, Aris Papasakellariou, 27 pages.
Third Generation Partnership Project (3GPP), 3GPP [90b-NR-22] Email discussion on the UE capability for the number of PDCCH BDs, Fred Takeda, 27 pages.
Third Generation Partnership Project (3GPP), 3GPP [90b-NR-22] Email discussion on the UE capability for the number of PDCCH BDs, Tony Ekpenyong, 27 pages.
Third Generation Partnership Project (3GPP), 3GPP [90b-NR-22] Email discussion on the UE capability for the number of PDCCH BDs, Wanshi Chen, 27 pages.
Third Generation Partnership Project (3GPP), 3GPP [90b-NR-22] Email discussion on the UE capability for the number of PDCCH BDs, Fred Takeda, 28 pages.
Third Generation Partnership Project (3GPP), 3GPP [90b-NR-22] Email discussion on the UE capability for the number of PDCCH BDs, Debdeep Chatterjee, 1 page.
3GPP TSG RAN Meeting#85, Title: R16 Ue power saving: PDCCH monitoring reduction (Year: 2019), RP-192176.

\* cited by examiner

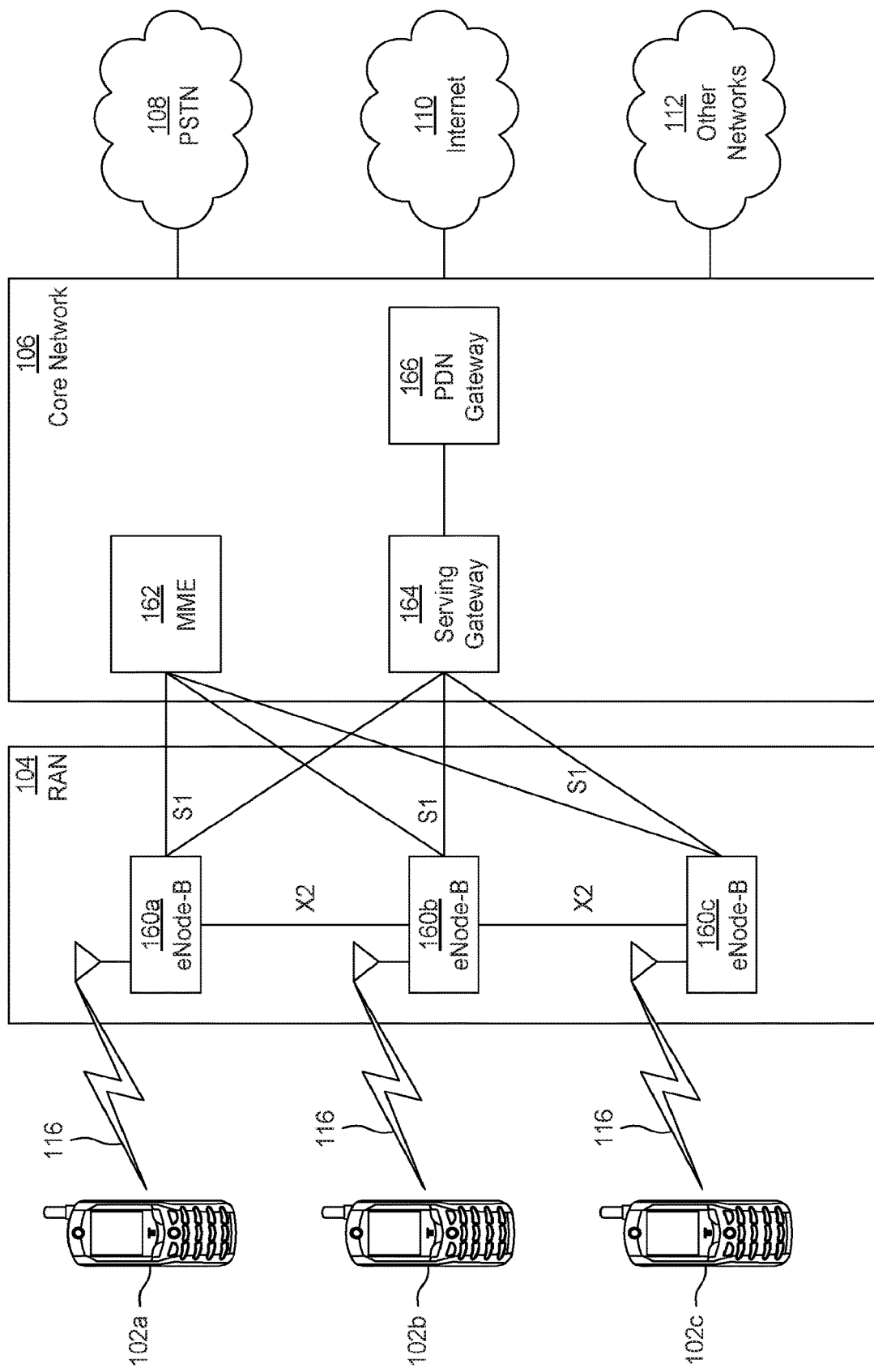

METHODS FOR PHYSICAL DOWNLINK CONTROL CHANNEL (PDCCH) CANDIDATE DETERMINATION

CROSS-REFERENCE TO RELATED APPLICATIONS

This application is a continuation of U.S. application Ser. No. 17/985,576, filed Nov. 11, 2022, which is a continuation of U.S. application Ser. No. 16/763,454, filed May 12, 2020, which issued as U.S. Pat. No. 11,553,469 on Jan. 10, 2023, which is a U.S. National Stage, under 35 U.S.C. § 371, of International Application No. PCT/US2018/060894, filed Nov. 14, 2018, which claims the benefit of U.S. Provisional Application No. 62/615,787, filed Jan. 10, 2018, and U.S. Provisional Application No. 62/585,992, filed Nov. 14, 2017, which are incorporated by reference as if fully set forth.

BACKGROUND

A radio access network (RAN) is part of a mobile telecommunication system providing wireless transmit receive units (WTRUs) with connection to a core network (CN). In fifth generation (5G) or next generation (NG) wireless systems, the RAN may be referred to as New Radio (NR) or next generation RAN. NR is designed to support great flexibility. Such flexibility ensures that WTRUs with different capabilities can be simultaneously served with different types of traffic. The different capabilities for NR are varied and may be classified into extreme Mobile Broadband (eMBB), Ultra High Reliable and Low Latency communications (URLLC), and massive Machine Type Communications (mMTC). In addition, NR needs to support transmission in much higher frequency bands, such as centimeter (cm)-wave and millimeter (mm)-wave frequencies. In order to support all of these capabilities and transmission methods, a WTRU may need to monitor a multitude of Physical Downlink Control Channel (PDCCH) candidates and determine when it is scheduled to receive a data transmission. As such, the WTRU would need to check all possible PDCCH candidates and this may necessarily increase blind detection complexity. Thus, it would be desirable to limit the blind detection complexity by determining which PDCCH candidates need to be monitored at any given moment.

SUMMARY

A wireless transmit/receive unit (WTRU) determines PDCCH candidates. For a slot, the WTRU determines a number of valid PDCCH candidates associated with at least one search space based on a number of designated search spaces associated with the WTRU in the slot, a type of the search space, a priority associated with the search space, a number of required CCE channel estimates associated with the search space, a maximum number of PDCCH candidates in a slot, and a number of control resource sets (CORESETs) associated with the slot. The WTRU may then attempt to decode CCEs in the at least one search space to recover a PDCCH associated with the WTRU. The WTRU may drop PDCCH candidates from the search space when the number of PDCCH exceeds a maximum value.

BRIEF DESCRIPTION OF THE DRAWINGS

A more detailed understanding may be had from the following description, given by way of example in conjunction with the accompanying drawings, wherein like reference numerals in the figures indicate like elements, and wherein:

FIG. 1C is a system diagram illustrating an example radio access network (RAN) and an example core network (CN) that may be used within the communications system illustrated in FIG. 1A according to an embodiment;

DETAILED DESCRIPTION

Figure 1A:
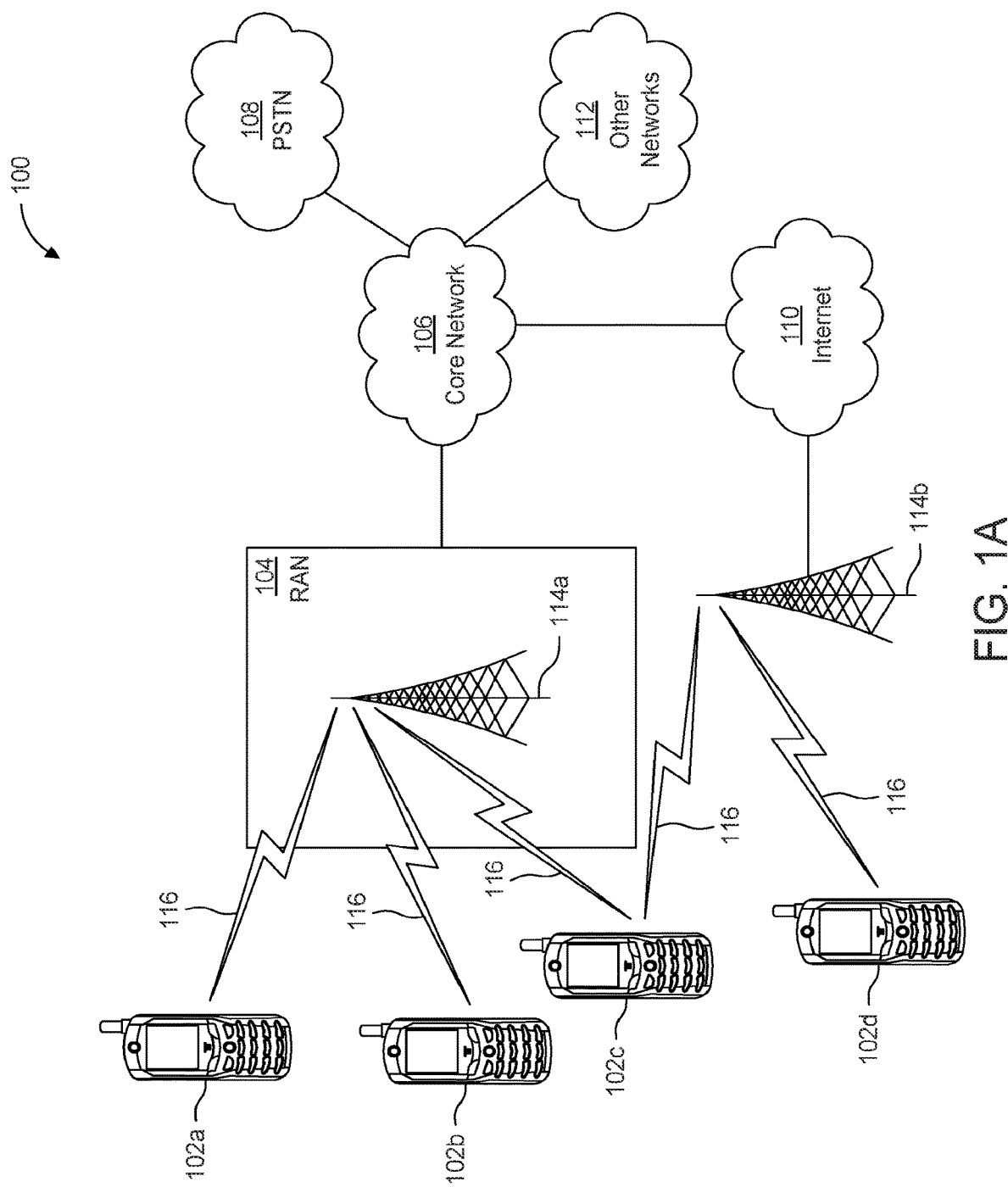
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102*a*, 102*b*, 102*c* and 102*d* may be interchangeably referred to as a UE.

The communications systems 100 may also include a base station 114*a* and/or a base station 114*b*. Each of the base stations 114*a*, 114*b* may be any type of device configured to wirelessly interface with at least one of the WTRUs 102*a*, 102*b*, 102*c*, 102*d* to facilitate access to one or more communication networks, such as the CN 106/115, the Internet 110, and/or the other networks 112. By way of example, the base stations 114*a*, 114*b* may be a base transceiver station (BTS), a Node-B, an eNode B, a Home Node B, a Home eNode B, a gNB, a NR NodeB, a site controller, an access point (AP), a wireless router, and the like. While the base stations 114*a*, 114*b* are each depicted as a single element, it will be appreciated that the base stations 114*a*, 114*b* may include any number of interconnected base stations and/or network elements.

The base station 114*a* may be part of the RAN 104/113, which may also include other base stations and/or network elements (not shown), such as a base station controller (BSC), a radio network controller (RNC), relay nodes, etc. The base station 114*a* and/or the base station 114*b* may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114*a* may be divided into three sectors. Thus, in one embodiment, the base station 114*a* may include three transceivers, i.e., one for each sector of the cell. In an embodiment, the base station 114*a* may employ multiple-input multiple output (MIMO) technology and may utilize multiple transceivers for each sector of the cell. For example, beamforming may be used to transmit and/or receive signals in desired spatial directions.

The base stations 114*a*, 114*b* may communicate with one or more of the WTRUs 102*a*, 102*b*, 102*c*, 102*d* over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 104/113 and the WTRUs 102*a*, 102*b*, 102*c* may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114*a* and the WTRUs 102*a*, 102*b*, 102*c* may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114*a* and the WTRUs 102*a*, 102*b*, 102*c* may implement a radio technology such as NR Radio Access, which may establish the air interface 116 using New Radio (NR).

In an embodiment, the base station 114*a* and the WTRUs 102*a*, 102*b*, 102*c* may implement multiple radio access technologies. For example, the base station 114*a* and the WTRUs 102*a*, 102*b*, 102*c* may implement LTE radio access and NR radio access together, for instance using dual connectivity (DC) principles. Thus, the air interface utilized by WTRUs 102*a*, 102*b*, 102*c* may be characterized by multiple types of radio access technologies and/or transmissions sent to/from multiple types of base stations (e.g., an eNB and a gNB).

In other embodiments, the base station 114*a* and the WTRUs 102*a*, 102*b*, 102*c* may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114*b* and the WTRUs 102*c*, 102*d* may implement a radio technology such as IEEE 802.11 to establish a wireless local area network (WLAN). In an embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114*b* may have a direct connection to the Internet 110. Thus, the base station 114*b* may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102*a*, 102*b*, 102*c*, 102*d*. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
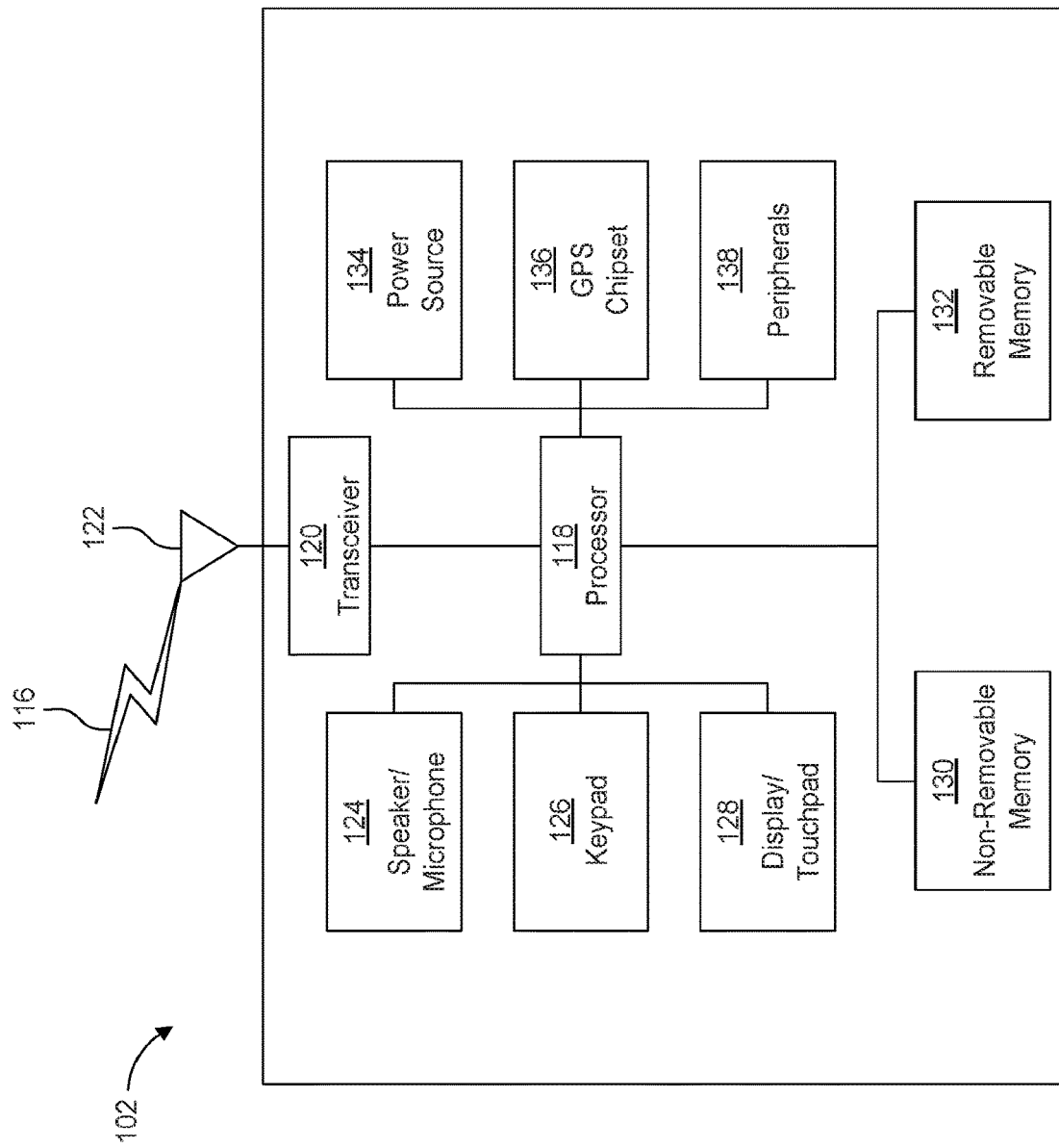
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the downlink (e.g., for reception)).

FIG. 10 is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 10, the eNode-Bs 160a, 160b, 160c may communicate with one another over an X2 interface.

The CN 106 shown in FIG. 10 may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
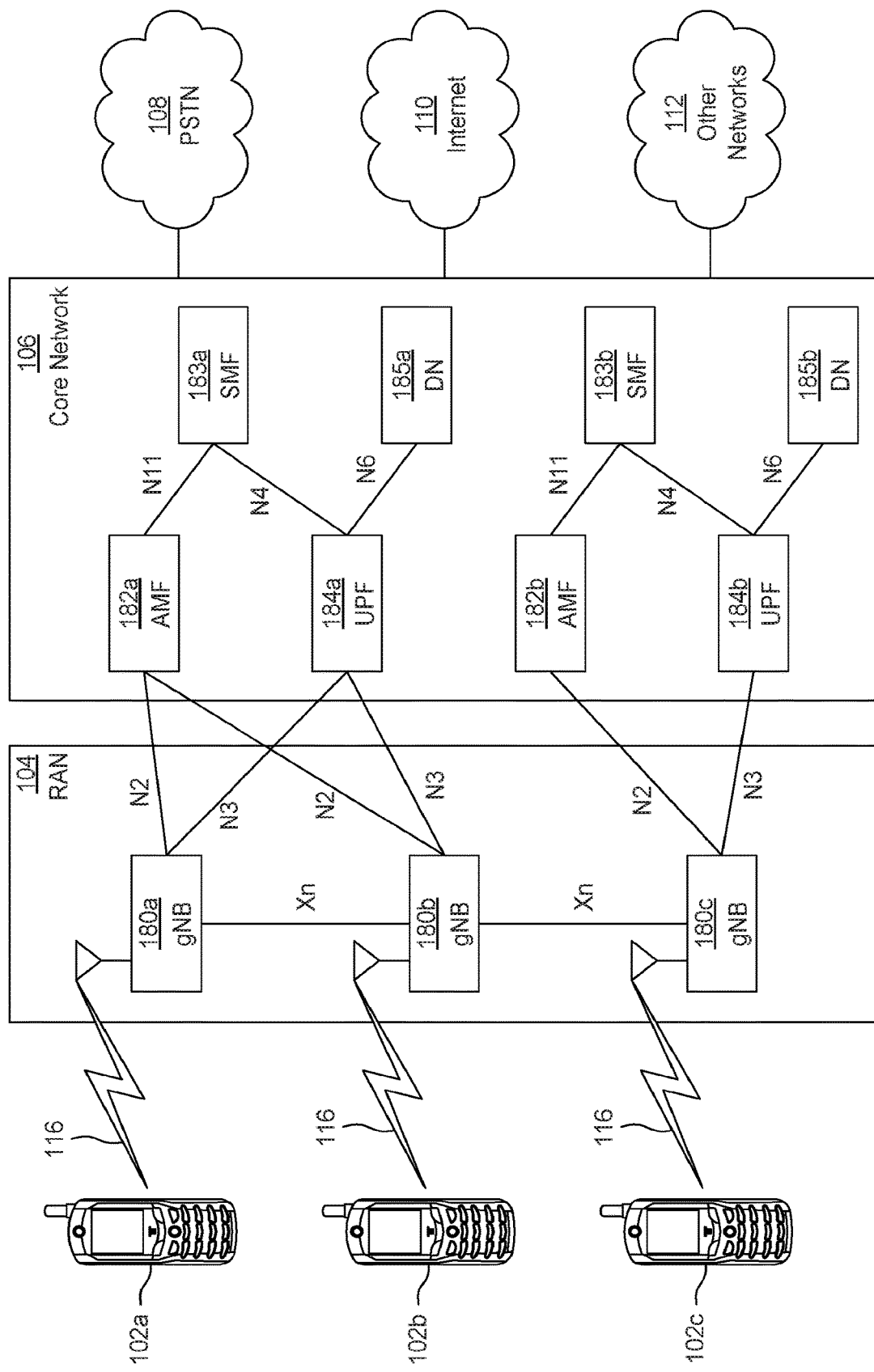
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180*a*, 180*b*, 180*c* may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184*a*, 184*b*, routing of control plane information towards Access and Mobility Management Function (AMF) 182*a*, 182*b* and the like. As shown in FIG. 1D, the gNBs 180*a*, 180*b*, 180*c* may communicate with one another over an Xn interface.

The CN 115 shown in FIG. 1D may include at least one AMF 182*a*, 182*b*, at least one UPF 184*a*,184*b*, at least one Session Management Function (SMF) 183*a*, 183*b*, and possibly a Data Network (DN) 185*a*, 185*b*. While each of the foregoing elements are depicted as part of the CN 115, it will be appreciated that any of these elements may be owned and/or operated by an entity other than the CN operator.

The AMF 182*a*, 182*b* may be connected to one or more of the gNBs 180*a*, 180*b*, 180*c* in the RAN 113 via an N2 interface and may serve as a control node. For example, the AMF 182*a*, 182*b* may be responsible for authenticating users of the WTRUs 102*a*, 102*b*, 102*c*, support for network slicing (e.g., handling of different PDU sessions with different requirements), selecting a particular SMF 183*a*, 183*b*, management of the registration area, termination of NAS signaling, mobility management, and the like. Network slicing may be used by the AMF 182*a*, 182*b* in order to customize CN support for WTRUs 102*a*, 102*b*, 102*c* based on the types of services being utilized WTRUs 102*a*, 102*b*, 102*c*. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183*a*, 183*b* may be connected to an AMF 182*a*, 182*b* in the CN 115 via an N11 interface. The SMF 183*a*, 183*b* may also be connected to a UPF 184*a*, 184*b* in the CN 115 via an N4 interface. The SMF 183*a*, 183*b* may select and control the UPF 184*a*, 184*b* and configure the routing of traffic through the UPF 184*a*, 184*b*. The SMF 183*a*, 183*b* may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184*a*, 184*b* may be connected to one or more of the gNBs 180*a*, 180*b*, 180*c* in the RAN 113 via an N3 interface, which may provide the WTRUs 102*a*, 102*b*, 102*c* with access to packet-switched networks, such as the Internet 110, to facilitate communications between the WTRUs 102*a*, 102*b*, 102*c* and IP-enabled devices. The UPF 184, 184*b* may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102*a*, 102*b*, 102*c* with access to the other networks 112, which may include other wired and/or wireless networks that are owned and/or operated by other service providers. In one embodiment, the WTRUs 102*a*, 102*b*, 102*c* may be connected to a local Data Network (DN) 185*a*, 185*b* through the UPF 184*a*, 184*b* via the N3 interface to the UPF 184*a*, 184*b* and an N6 interface between the UPF 184*a*, 184*b* and the DN 185*a*, 185*b*.

In view of FIGS. 1A-1D, and the corresponding description of FIGS. 1A-1D, one or more, or all, of the functions described herein with regard to one or more of: WTRU 102*a*-*d*, Base Station 114*a*-*b*, eNode-B 160*a*-*c*, MME 162, SGW 164, PGW 166, gNB 180*a*-*c*, AMF 182*a*-*ab*, UPF 184*a*-*b*, SMF 183*a*-*b*, DN 185*a*-*b*, and/or any other device (s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

To enable efficient use of the spectrum by a range of devices with varying capability along with varying needs, control signaling has been made forward compatible in NR. For downlink (DL) or uplink (UL) scheduling, among other reasons, a WTRU may monitor PDCCH candidates in a search space located in a Control Resource Set (CORESET). A WTRU may be configured with multiple CORESETs in a given carrier, for example, in different frequency portions of a carrier or in different symbols of a slot. A PDCCH candidate may be defined as a set of New Radio-Control Channel Elements (NR-CCEs) which themselves are sets of New Radio-Resource Element Groups (NR-REGs). An NR-REG may be defined as one Resource Block (RB) during one OFDM symbol or one radio frame. An NR-PDCCH may be mapped contiguously or non-contiguously in frequency. The terms NR-PDCCH and PDCCH may be used interchangeably herein.

A WTRU may attempt to detect and decode (i.e. using blind detection) Downlink Control Information (DCI) intended for the WTRU in a PDCCH candidate. A PDCCH candidate comprises a set of NR-CCEs. Such PDCCH candidates may be located within a search space configured for a specific WTRU. The search space may refer to the set of NR-CCE locations in which the WTRU may find its PDCCHs. Search spaces may be common to all WTRUs in a cell or transmission/reception point (TRP), common to a group of WTRUs in a cell/TRP or WTRU-specific. In turn, the search spaces configured for the WTRU may be located in a plurality of control resource sets (CORESETs) configured for a WTRU. The search spaces and/or CORESETs may be associated with a monitoring periodicity.

To ensure that a WTRU is capable of determining whether it has a DCI in any of its PDCCH candidates, there may be a limit to how many PDCCH candidates that a WTRU may have to monitor at any given moment. For example, a WTRU may have a maximum number of PDCCH candidates in a slot. In another example, a WTRU may have a maximum number of NR-CCEs on which all of the PDCCH candidates of a slot may be mapped to. The maximum number of NR-CCEs on which all of the PDCCH candidates of a slot may be mapped to may be a function of the CORESET-precoder-granularity parameter provided by higher layer signaling.

The set of PDCCH candidates may be associated with at least one of a search space, CORSET, time element, aggregation level, DCI format, component carrier (CC) and/or bandwidth part (BWP). In a case where the set of PDCCH candidates is associated with the search space, the maximum number of PDCCH candidates may further depend on the search-space type (for example, common, group-common or WTRU-specific search space). In a case where the set of candidates is associated with a time element, the WTRU may monitor up to a maximum number of PDCCH candidates per symbol (or group thereof), or per slot (or group thereof), or per subframe (or group thereof), or per TTI. Such a time element may depend on the subcarrier size (SCS) or may be defined with respect to a default SCS. In an example, a WTRU may monitor up to a maximum number of PDCCH candidates per absolute time period.

Hereinafter, a set of PDCCH candidates associated with a single parameter described above may be referred to as a group of PDCCH candidates, and the parameters described above as grouping parameters.

A number of PDCCH candidates may be configured. A WTRU may be configured with a number of PDCCH candidates per group up to the maximum number of PDCCH candidates. The maximum number of PDCCH candidates per group may depend on a WTRU's capability or may be fixed or may be configurable. The configuration may be accomplished via a DCI, MAC Control Element (CE), and/or higher layer signaling. The configuration may be WTRU-specific, group-common, or common for all WTRUs. For a common configuration, the maximum number of PDCCH candidates may be included in system information.

In an embodiment, a WTRU may be configured to operate with less than a maximum number of PDCCH candidates per group. In such a case, the number of PDCCH candidates per group may be configured via DCI, MAC CE, and/or higher layer signaling. In one case, the number of PDCCH candidates per group is configured in a WTRU-specific manner.

The grouping parameter for which the maximum number of PDCCH candidates applies to may differ from the grouping parameter for which the WTRU-specific number of PDCCH candidates applies to. For example, a maximum number of PDCCH candidates may be applied to a slot, whereas a WTRU-specific number of PDCCH candidates may be configured per CORESET. As such, each of the n CORESETs located within a slot may have the WTRU-specific number of PDCCH candidates. The configuration of a (maximum) number of PDCCH candidates per group may be done explicitly, as described above. Alternatively, the configuration may be done implicitly via a function dependent on another WTRU configuration. The function may depend on at least one of the number of CORESETs configured, number of search spaces configured, number of CCs configured or activated, number of BWPs configured or activated, operating BW (possibly aggregated over all CCs and/or BWPs), or SCS. For example, the number of PDCCH candidates in a CC or BWP may depend on the SCS. In another example, the number of PDCCH candidates in a slot may depend on the number of different SCS a WTRU may monitor in that slot. In another example, the function for determining the number of PDCCH candidates may depend on the number of CCEs to which the aggregate set of all PDCCH candidates map to.

When configured with one or more values for a number of PDCCH candidates per group, there may be situations where all of the values may not align. For example, a WTRU may be configured with a number of PDCCH candidates per slot of X and a number of PDCCH candidates per CORESET of Y. In a slot, there may be n CORESETs and it is possible that n times Y is greater than X (i.e. nY>X). In such a case, precedence and scaling is needed.

The WTRU may receive a prioritized list of grouping parameters. In such a case, the number of PDCCH candidates for a first group with the highest priority may lead to scaling the actual number of PDCCH candidates for a second group with lower priority. For example, the number of PDCCH candidates per slot may have the highest priority and any other number of PDCCH candidates may need to be scaled to ensure that a WTRU need not monitor more PDCCH candidates per slot than configured. In the example of CORESETs presented above, a WTRU may be configured with up to X PDCCH candidates per slot and up to Y PDCCH candidates per CORESET. In the event of a situation where a WTRU has n CORESETs in a slot and n times Y is greater than X (i.e. nY>X), then the WTRU may scale the number of PDCCH candidates per CORESET.

In an embodiment where a WTRU is configured with a single value of PDCCH candidates (i.e. for a single grouping parameter), the WTRU may then distribute the PDCCH candidates over a set of other grouping parameters. For example, the WTRU may have a number of PDCCH candidates per slot and may receive an explicit indication of how to spread the candidates over the CORESETs present within a slot.

In an embodiment, the WTRU may implicitly determine the distribution of PDCCH candidates based on a set of grouping parameters. It should be noted that the distribution need not be uniform. The distribution of PDCCH candidates may be a function of at least one of time instance, time duration, number of monitored CORESETs in a time unit, number of CORESET symbols, type of CORESETS in a time unit, Number of PRBs used for the CORESET, Periodicity of a CORESET within the slot, Number of search spaces, Search Space Type, Aggregation level, Number of active or configured CCs, Number of active or configured BWPs, BW size of a BWP/CC/sum of BW of multiple (e.g. active) CCs/BWPs, SCS of a CC/BWP, DCI Type, Traffic type, and/or DRX state. In case where the distribution of PDCCH candidates is a function of the time instance, depending on the slot index, the WTRU may determine the number of PDCCH candidates. In case where the distribution of PDCCH candidates is a function of the time duration, depending on the slot duration, a WTRU may determine the number of PDCCH candidates. In case where the distribution of PDCCH candidates is a function of the number of monitored CORESETs in a time unit, the number of PDCCH candidates per CORESET may depend on the number of CORESETs in a slot. This may be per CC or BWP or in total over all CCs or BWPs. In case that the distribution of PDCCH candidates is a function of the number of CORESET symbols, the number of symbols of a CORESET may determine the number of PDCCH candidates within that CORESET.

When the distribution of PDCCH candidates is a function of the type of CORESETs in a time unit, the number of PDCCH candidates per CORESET may depend on a parameter of the CORESET and a parameter of other CORESETs within a slot. In such a case, the parameter may be a quasi-co-location (QCL) to a reference signal. Thus, depending on the RS QCL with a CORESET and any other CORESET within a slot, the WTRU may determine the number of PDCCH candidates. This may enable allocating a different number of PDCCH candidates per beam that a WTRU may be monitoring. In such a case, transmissions on a beam may be tied to a specific CORESET and depending on the number of beams that may be supported in a slot, the WTRU may determine a, possibly different, number of PDCCH candidates per beam (i.e. per CORESET).

When the distribution of PDCCH candidates is a function of the number of PRBs used for the CORESET, a CORESET spanning more PRBs may be allocated with more PDCCH candidates. When the distribution of PDCCH candidates is a function of the periodicity of a CORESET within the slot, a CORESET used for non-slot scheduling may be present in multiple instances within a slot. The number of instances may determine the number of PDCCH candidates (e.g. per instance). When the distribution of PDCCH candidates is a function of the number of search spaces, the number of search spaces within a CORESET may determine the number of PDCCH candidates within that CORESET. When the distribution of PDCCH candidates is a function of the search Space Type, a common search space may have fewer candidates than a group common search space or than a WTRU-specific search space. When the distribution of PDCCH candidates is a function of the aggregation level, a search space may have only candidates of a subset of aggregation levels, and the subset may determine the number of PDCCH candidates. In case that the distribution of PDCCH candidates is a function of the number of active or configured CCs, depending on the number of active CCs, each CC within a slot may have a subset of the total available PDCCH candidates. The distribution of PDCCH candidates within a CC may follow rules described herein.

When the distribution of PDCCH candidates is a function of the number of active or configured BWPs, depending on the number of active BWPs, each BWP within a slot may have a subset of the total available PDCCH candidates. The distribution of PDCCH candidates within a BWP may follow rules described herein. When the distribution of PDCCH candidates is a function of the BW size of a BWP or CC or sum of BW of multiple (e.g. active) CCs or BWPs, a larger CC may serve more WTRUs and to alleviate the blocking probability, more PDCCH candidates may be allocated to the CC. When the distribution of PDCCH candidates is a function of the SCS of a CC or BWP, a larger SCS may lead to fewer PDCCH candidates assigned to the CC or BWP. In an example, a WTRU configured with multiple CCs/BWPs of different SCS may determine the total number of PDCCH candidates per CC/BWP based on a reference SCS. In another example, a WTRU configured with multiple CCs/BWPs of different SCS may assume the PDCCH candidates are distributed in a manner that is a function of the SCS of each CC/BWP, and/or a function of the total set of SCSs configured for the WTRU.

When the distribution of PDCCH candidates is a function of the DCI Type, some DCI transmissions may be repeated (for example, repeated in a slot in one or more search spaces, in one or more CORESETs). This may enable an increase in PDCCH reception reliability. In such a case, the detection of such a DCI may require a combination of multiple PDCCH blind detections. Therefore, supporting that DCI type may have an effect on the number of PDCCH candidates within a slot. When the distribution of PDCCH candidates is a function of the traffic type, a PDCCH candidate may be associated with a traffic type. In an example, depending on whether a slot, or CORESET or search space may be used for eMBB and/or URLLC may affect the number of PDCCH candidates associated with it. When the distribution of PDCCH candidates is a function of the DRX state, the DRX state may affect the number of PDCCH candidates of a group or per grouping parameter. For example, a DRX state may be tied to a limit of the number of PDCCH candidates of a specific aggregation level while ensuring a fixed number of PDCCH candidates of another aggregation level.

The distribution of PDCCH candidates may be a function of CCE mapping. For example, the total number of PDCCH candidates may depend on the total aggregate number of CCEs used for all the PDCCH candidates. In such a case, overlap of CCEs for different candidates, or candidates using fewer CCEs, may enable a higher number of total PDCCH candidates.

When a non-uniform allocation of PDCCH candidates over a set of grouping parameters exists, a priority may be assigned. For example, a CORESET may have higher priority (for example, if it is associated with higher priority transmissions) and may thus be allocated a larger amount of PDCCH candidates than a CORESET associated with a lower priority. In another example, a search space within a CORESET may have higher priority than another search space in the same CORESET and may thus be allocated more PDCCH candidates.

In an embodiment, a WTRU may be assigned a set of PDCCH candidates associated with a grouping parameter, but the WTRU may have to scale down the number of PDCCH candidates (fro example, due to a collision of multiple grouping parameters within an allowable period). For example, a WTRU may be configured with a number of PDCCH candidates per search space as well as a maximum number of PDCCH candidates per slot. In the event of multiple search spaces colliding in a slot, the WTRU may have to scale down the number of PDCCH candidates in at least one of the search spaces. Each PDCCH candidate within a group may have an index. For the case where a WTRU may attempt blind detection on m PDCCH candidates within a group, the m candidates with highest (or lowest) index may be used. The valid PDCCH candidates may be determined as a function of at least one of: the size of the group, the value m, the cell (or TRP) ID, the WTRU ID, the SCS, the BWP ID, the CC ID, and/or a factor of the grouping parameter (for example, for a search space grouping parameter, the factor may be the aggregation level).

The WTRU may determine the maximum number of PDCCH candidates to accommodate all of the groups of a first grouping parameter. Then with a maximum number of PDCCH candidates based on a second grouping parameter, the WTRU may use a pruning function to reduce the number of PDCCH candidates in the groups associated with the first grouping parameter. For example, a WTRU may have n CORESETs in a slot, each CORESET may be configured with Y PDCCH candidates, however a slot may have a maximum number of X PDCCH candidates. If n times y is greater than X (i.e. nY>X), then the WTRU may use a pruning function to reduce the number of candidates for each CORESET.

In another example, a WTRU may be configured with n CORESETs in a slot. A CORESET may be configured with Y PDCCH candidates. A slot may have a maximum number of CCEs on which PDCCH candidates may be mapped. PDCCH candidates may be mapped to such CCEs, (for example, where such maximum number of CCEs may be used to reduce channel estimation complexity). The WTRU may use a pruning function to reduce the number of candidates for at least one CORESET if the sum of all CCEs used for the nY PDCCH candidates exceeds a maximum configured value.

In another example, PDCCH candidates may be pruned to achieve both the maximum number of PDCCH candidate per slot and the maximum number of CCEs used by the PDCCH candidates per slot. Such a pruning algorithm may consider all of the search spaces present in a slot and prune PDCCH candidates from one or more such search space. The pruning algorithm may be stopped when a remaining number of candidates is less than a maximum value. For example, the pruning algorithm may be stopped when the sum of all PDCCH candidates that have not yet been pruned is equal to a certain value. Alternatively, the pruning algorithm may be stopped when the total number of required CCE estimates for the remaining PDCCH candidates is less than the maximum value. Note that the stopping criteria may be modified as required while not affecting the details of the pruning function. In this example, a random cycling method is used to remove some PDCCH candidates per group (in this case, per search space or per CORESET). Such a random cycling method may help reduce PDCCH blocking probability by ensuring that the same candidates are not always pruned in every slot.

A WTRU configured with multiple PDCCH monitoring occasions in a slot may determine a subset of PDCCH candidates $m_{n_{CI}}$ per search space such that $m_{n_{CI}} = M_{p,n_{CI}}^{*(L)} - 1$ and $M_{p,n_{CI}}^{*(L)} \leq M_{p,n_{CI}}^{(L)}$ and $$\sum_{p \in P} M_{p,n_{CI}}^{*(L)} \leq X,$$

where $m_{n_{CI}}$ is a PDCCH candidate identifier, $M_{p,n_{CI}}^{*(L)}$ is the maximum number of PDCCH candidates a WTRU is configured to monitor for CORESET p and aggregation level L, and X is the maximum number of blind decoding attempts. The WTRU may further prune the number of PDCCH candidates per search space such that the total number of CCEs for all the PDCCH candidates within a slot is less than or equal to Y. The value of Y may depend on the CORESET-precoder-granularity. For example, the value of Y may correspond to, or be proportional to, a product between a maximum number of CCEs for which the same precoder may be assumed Z and the CORESET-precoder-granularity (possibly divided by a number of REGs per CCE, if CORESET-precoder-granularity is in units of REGs). This approach ensures that the channel estimation effort to be undertaken by the WTRU remains within a reasonable limit. The sum of the CCEs used for all the PDCCH candidates may be quantized to determine the number of channel estimations required. Such a number may be determined by the WTRU as a function of CCEs used for the PDCCH candidates and the CORESET-precoder-granularity.

The WTRU may prune the PDCCH candidates in a slot by first setting $M_{p,n_{CI}}^{*(L)} = M_{p,n_{CI}}^{(L)}$ for all monitored p and L, and then cycling through monitored p and L and reducing the value of $M_{p,n_{CI}}^{*(L)}$ by 1 at each iteration. The order of the cycling is determined based on the following:

$$i_1 = (n_{RNTI} \cdot 2^{14} + n_s \cdot 2^9 + N_{ID}^{cell}) \bmod(|Q|)$$

$$p_0 = q_{i_1}$$

$$i_2 = (n_{RNTI} \cdot 2^{14} + n_s \cdot 2^9 + N_{ID}^{cell}) \bmod(|L|)$$

$$L_0 = L_{i_2}$$

For $1 \leq j \leq |Q| - 1$ $$p_j = q_{i_1 + j},$$

For $1 \leq k \leq |L| - 1$ $$L_k = L_{i_2 + k}$$

where $Q = \{q_0, q_1, \ldots q_{|Q|}\}$ is the set of all monitored control resource sets (i.e. Q is a subset of P).

At the end of each pruning step within each cycle, the WTRU may determine if both the X and Y criteria are achieved. If so, the pruning may be terminated and the set of monitored PDCCH candidates may be determined.

Figure 4:
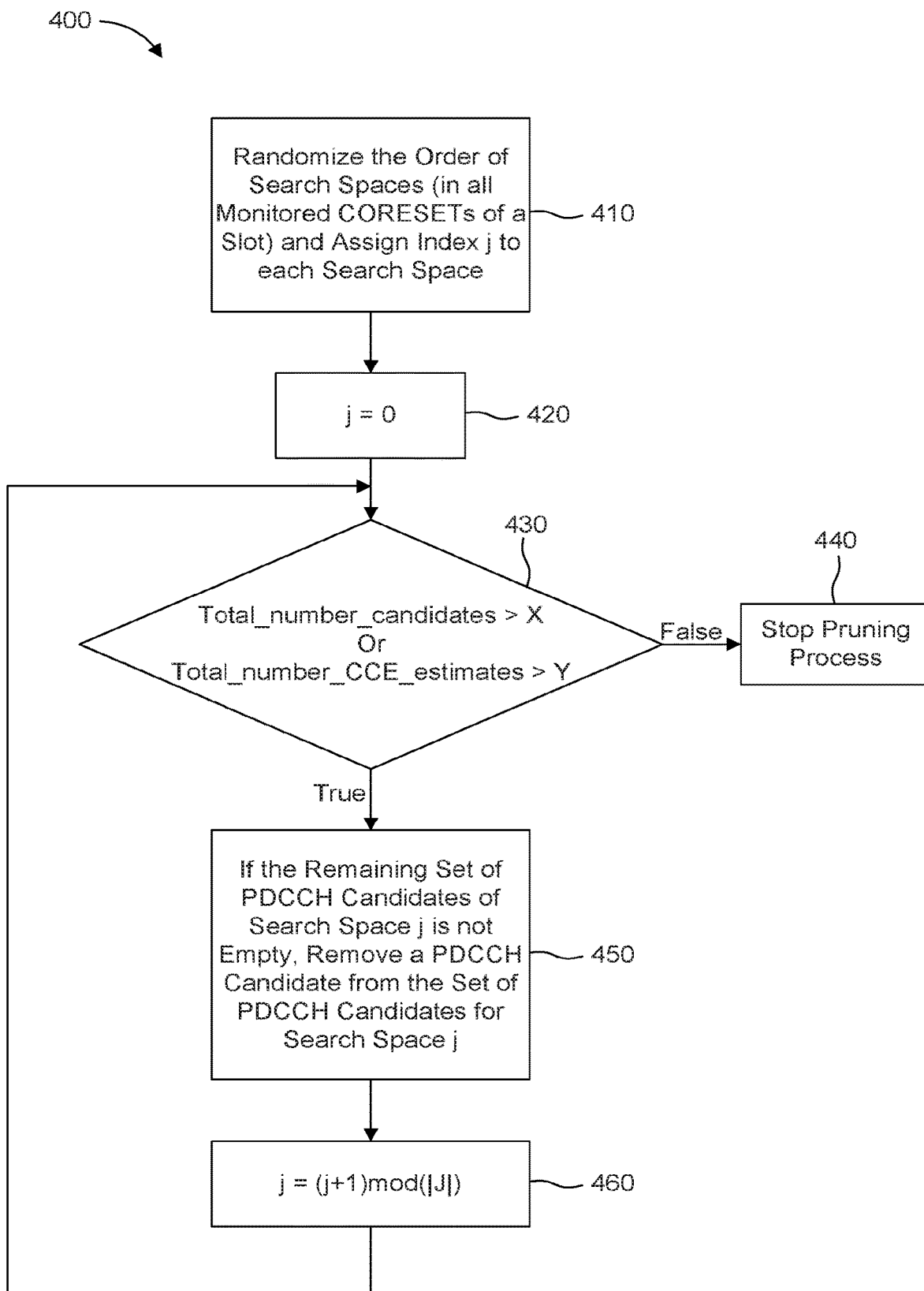
FIG. 4 is a method flow diagram showing an algorithm for dropping PDCCH candidates from a search space.

Referring to FIG. 4, a method 400 of the pruning algorithm described herein is shown. The method 400 starts at step 410, where the order of a WTRU's search spaces are randomized and an index is assigned to each search space. For the first indexed search space, step 420, a determination is made whether the total number of PDCCH is above a threshold, step 430. Alternatively, step 430 may include determining whether a total number of CCE estimates is above a threshold. If the threshold of step 430 is not exceed, in either case, the pruning process is stopped at step 440. If the threshold is exceed at step 430 (in other words, the total number of PDCCH candidates is above a threshold or the total number of CCE estimates is above a threshold), then at step 450 a PDCCH candidate is removed from the set of PDCCH candidates for the indexed search space. At step 460, the process advances to the next indexed search space and step 430 is repeated.

To further randomize the pruning function, the elements in $m_{n_{CI}}$ may first be randomized, possibly as a function of at least one of the WTRU ID, RNTI, slot number, cell ID, carrier ID, the SCS or the BWP ID.

In another example, the criterion related to the maximum number of CCEs to which all the PDCCH candidates may map, may have higher priority. In such a case, the order of pruning over aggregate level L may be determined to reduce candidates with greater CCE footprint first (e.g. the WTRU may prune candidates with higher aggregation level first).

Figure 2:
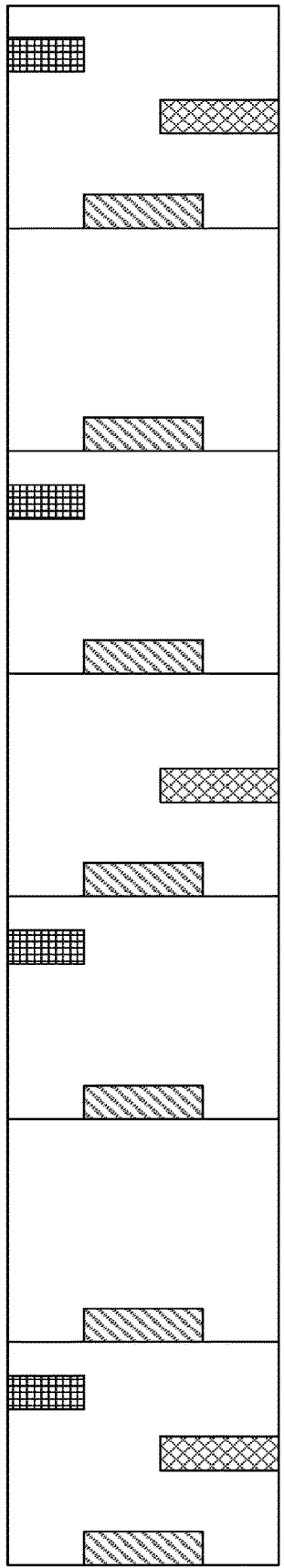
FIG. 2 is a diagram illustrating an example Physical Downlink Control Channel (PDCCH) candidate allocation among a variable number of control resource sets (CORESETS) per slot.

FIG. 2 illustrates an example Physical Downlink Control Channel (PDCCH) candidate allocation among variable number of control resource sets (CORESETs) or search spaces per slot. In this example, a WTRU may be configured with a maximum number of PDCCH candidates per slot. The WTRU may be configured with multiple CORESETs or search spaces each with different monitoring occasions (possibly to enable slot and non-slot scheduling). The number of CORESETs or search space per slot may vary. For the case where there are n CORESETs or search spaces within a slot, the WTRU may assume each CORESET or search space has floor(X/n) PDCCH candidates (assuming X PDCCH candidates per slot). Alternatively or additionally, the number of PDCCH candidates per CORESET or search space may not be uniform and may depend on the CORESET or search space type (for example, based on the beam associated with the CORESET).

As shown in FIG. 2, a WTRU may monitor a variable number of CORESETS or search spaces per slot (i.e. where the monitoring periodicity of each CORESET or search space is different). In this example, the WTRU may have a fixed number of PDCCH candidates per slot. In such a case, the fixed number of PDCCH candidates per slot may need to be allocated depending on the number of CORESETS or search space (and possibly the type of CORESETS or search spaces) in a slot. In the example shown in FIG. 2, there are a maximum of 44 PDCCH candidates per slot, configured by way of one the methods described above. In slot n, the 44 PDCCH candidates may be allocated such that a common search space (CSS) has greater priority than a UE specific search space (UESS 1), and UESS 1 has greater priority than UESS 2. Thus, in the example, in slot n (and n+6), the WTRU determines that the total number of PDCCH candidates to accommodate all monitored search spaces would exceed the maximum value. As such, the WTRU drops some (for exmaple, all) PDCCH candidates from UESS2.

In other slots, such as in slot n+1 and in slot n+2, the total number of PDCCH candidates to accommodate the monitored search spaces does not exceed the maximum value and as such the WTRU monitors all assigned PDCCH candidates. The exact number of PDCCH candidates per CORESET or search space may be determined as a function of priority level, total number of PDCCH candidates to share, number of CORESET or search space Types, maximum number of PDCCH candidate per CORESET search space (or per CORESET or search space Type) or the like as described above. The selection of the PDCCH candidates within a CORESET or search space may depend on the slot number, the WTRU ID, the CORESET or search space Type, or any other parameter as described herein.

In an embodiment, a WTRU may be configured with a maximum number of PDCCH candidates per carrier per slot (e.g. X). Furthermore, the WTRU may be configured with a number of PDCCH candidates per CORESET (e.g. Y). For slots with n CORESETS, the number of PDCCH candidates per CORESET is Y as long as n times Y is less than or equal to X (i.e. n MO, otherwise it is floor(X/n).

In another embodiment, a WTRU may have a configured or fixed number of PDCCH candidates per slot and be configured with multiple active BWPs in the slot. The PDCCH candidate distribution may be a function of total number of BWP, BWP index, BWP size and SCS of the BWP. For example, the X total PDCCH candidates may be split unevenly such that larger BWPs have more PDCCH candidates than smaller BWPs. Alternatively, the configured number of PDCCH candidate per slot may be per reference SCS slot size. Therefore, a BWP with larger SCS may have fewer PDCCH candidates per its slot duration than another BWP with smaller SCS.

In another embodiment, a WTRU may have a configured or fixed number of PDCCH candidates per slot and be configured with multiple CORESETs in a slot. The PDCCH candidates may be allocated, possibly in a uniform manner, to the CORESETs present in a slot. The WTRU may also have a DRX pattern operating on sub-slot level. For example, in a DRX state, the WTRU may only monitor a subset of all CORESETs in a slot. In such case, the number of PDCCH candidates per CORESET may depend on the DRX state.

Figure 3:
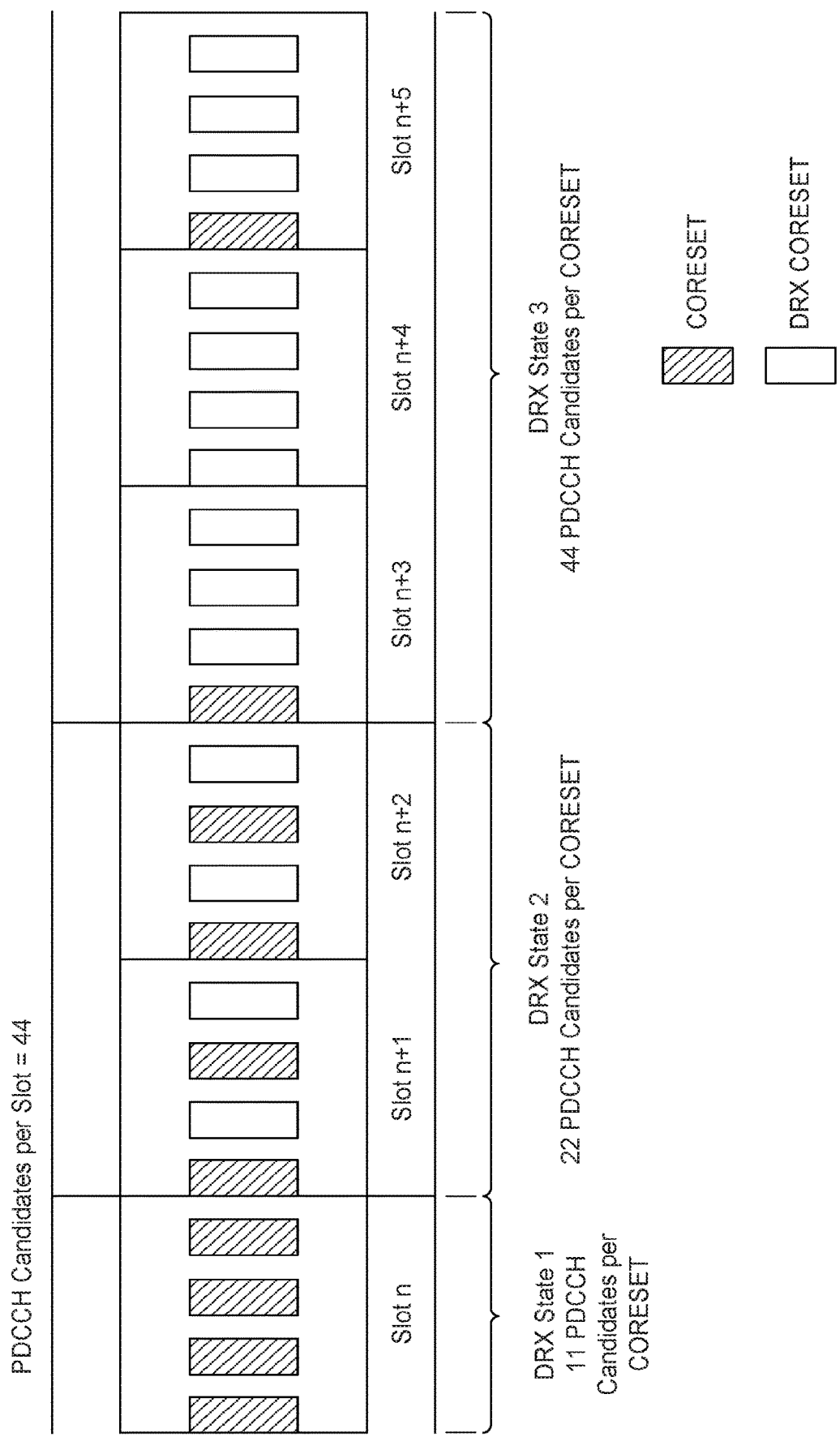
FIG. 3 is a diagram illustrating an example PDCCH candidate allocation for different discontinuous reception (DRX) states.

FIG. 3 illustrates an example PDCCH candidate allocation for different discontinuous reception (DRX) states. As shown in FIG. 3, a WTRU may operate with fixed number of PDCCH candidates per slot. In the example shown in FIG. 3, there are 44 PDCCH candidates per slot. The WTRU may operate under different DRX states in each slot and each DRX state may reduce the number of CORESETs (or search spaces) that a WTRU monitors in a given slot. In the example case shown in FIG. 3, for slots in DRX state 1, a WTRU has 4 CORESETs to monitor per slot and thus may assume 11 PDCCH candidates per CORESET. The WTRU monitors 11 PDCCH candidates per slot because there are 4 CORESETs, and thus allocates the 44 PDCCH candidates equally amongst the 4 CORESETs. For slots in DRX state 2, the WTRU has 2 CORESETs to monitor per slot and may thus determine to monitor 22 PDCCH candidates per CORESET. For slots in DRX state 3, some slots have a single CORESET and the WTRU may then determine to monitor all 44 PDCCH candidates in that CORESET. Other slots have zero CORESETs in this DRX state. However, given the constraint that there is a maximum of 44 PDCCH candidates per slot, the candidates may not be re-allocated from a slot with no CORESETs to a slot with CORESETs. However, in the case of multiple BWP or CC, it is possible that other BWP or CC may take advantage of the unused PDCCH candidates in those slots.

A WTRU may determine the number of PDCCH candidates as a function of previously received DCI. A WTRU may detect and decode a first DCI that may affect the number of PDCCH candidates for an upcoming set of resources. For example, a WTRU may detect and decode a first DCI for a data transmission in a slot, and the WTRU may then adjust the number of PDCCH candidates that it may blindly detect for the duration of the slot.

In an embodiment, a WTRU may be configured for both slot and non-slot scheduling. The WTRU may detect a DCI in a first PDCCH candidate location for a transmission in a slot (possibly the same slot as that which the DCI was transmitted in). The scheduled data transmission may overlap the transmission of other PDCCH candidates (for example, overlap in time). In such a case, the WTRU may reduce the number of PDCCH candidates to blind detect thereby eliminating PDCCH candidates that overlap the previously scheduled transmission. This may reduce complexities involved with simultaneous data reception and blind detection of other PDCCH candidates. An example of this is where a WTRU is configured with multiple CORESETs in a slot, and in different time instances. The WTRU may detect and decode a DCI in a first CORESET for a transmission overlapping in time with a second CORESET. The WTRU may attempt blind detection on a reduced number of PDCCH candidates of the second CORESET (for example, if the CORESET is in frequency resources orthogonal to the data transmission).

In an embodiment, a WTRU may be scheduled for a transmission in a subset of symbols of a slot (possibly from a DCI transmitted in the same slot or transmitted in a previous slot). For any other PDCCH candidate grouping parameter in a slot with the scheduled transmission, the WTRU may reduce the number of PDCCH candidates. For example, a WTRU is scheduled for a transmission on a first set of symbols in a slot, and the WTRU is also configured with more CORESETs within the slot. In such a case, the WTRU may reduce the number of PDCCH candidates in the remaining CORESETs of the slot. This may reduce complexities involved with simultaneous data processing and blind detection of other PDCCH candidates.

In these examples, if each CORESET has up to Y PDCCH candidates, upon being scheduled in a first CORESET with a data transmission simultaneous to or in a same slot as the reception of the second CORESET, the WTRU may attempt blind detection on Z PDCCH candidates in the second CORESET, where Z<Y. This example may be extended to the case where the first DCI schedules the WTRU over multiple slots (for example, using slot aggregation). In such a case, the WTRU may alter the number of PDCCH candidates in the set of slots for which the scheduling assignment is valid.

In an embodiment, a WTRU may detect and decode a DCI in a first PDCCH candidate indicating a slot-based scheduling assignment. The WTRU may not expect other DCI for non-slot based transmissions occurring within the slot of the scheduled assignment on that CC and/or BWP. The WTRU may thus increase the number of PDCCH candidates for non-slot based scheduling on any CC and/or BWP where no slot based scheduling assignment is present.

The time between a DCI scheduling a transmission and the transmission itself may also determine the number of other PDCCH candidates that a WTRU may attempt to blind detect, for that CC and/or BWP or for other CCs and/or BWPs.

Figure 5:
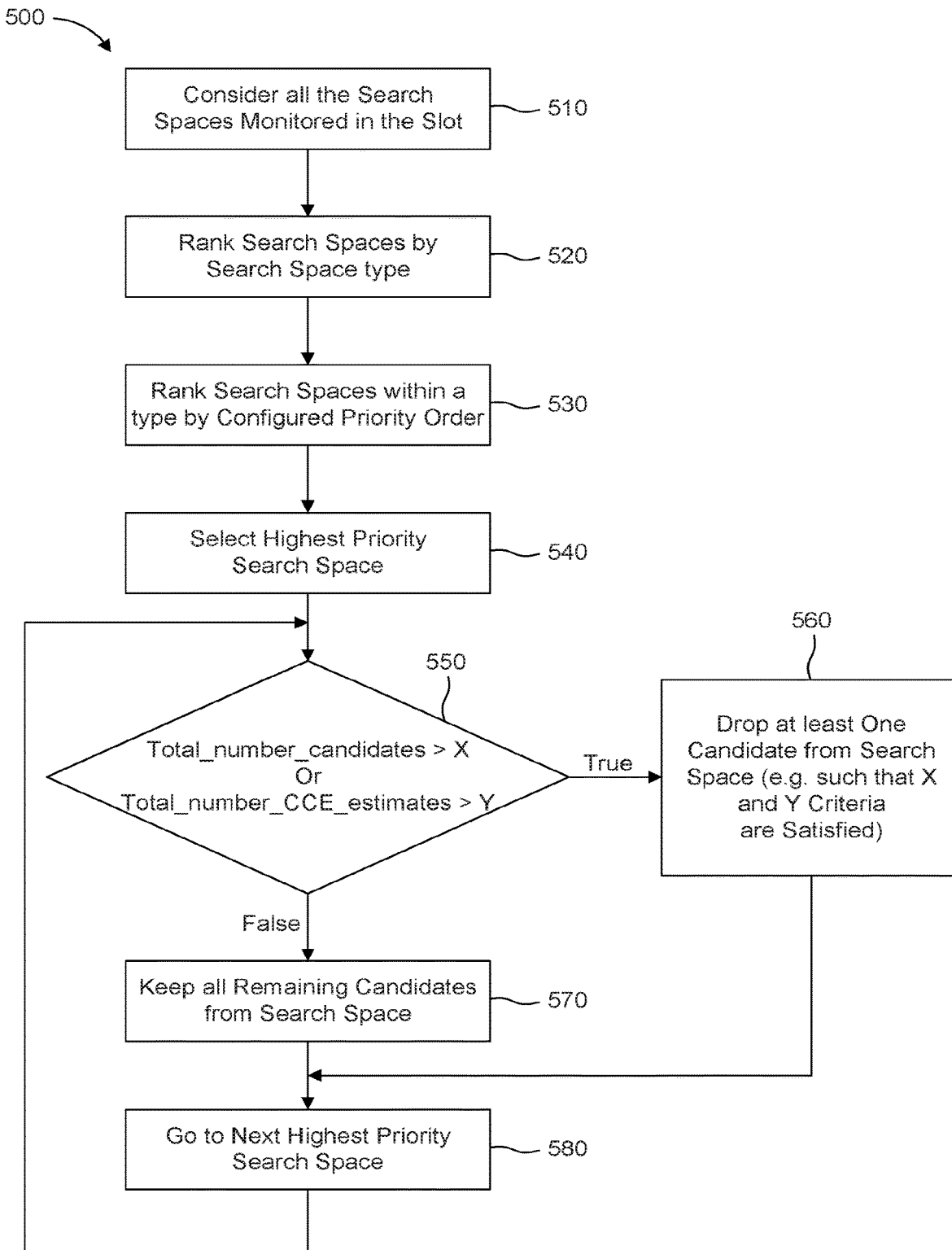
FIG. 5 is a method flow diagram showing one PDCCH candidate determination according to the embodiments described herein.

Referring to FIG. 5, a method flow diagram 500 according to several aspects described herein is shown. Beginning at step 510, a WTRU considers all of the search spaces to be monitored in a slot. The WTRU ranks the search spaces by search space type, step 520. The WTRU ranks search spaces within a search space type by configured priority order, step 530. The WTRU then selects a highest priority search space, step 540. For the select search space, a determination is then made whether the total number of PDCCH is above a threshold, step 550. Alternatively, step 550 may include determining whether a total number of CCE estimates is above a threshold. If the threshold of step 550 is exceeded, in either case, at least one PDCCH candidate from the search space is dropped, step 560. In one scenario, all potential PDCCH candidates may be dropped from the search space. If the threshold of step 550 is not exceeded, all remaining PDCCH candidates are kept in the search space, step 570. The next highest priority search space is selected, step 580, and the process repeats at step 550 using the sum of the PDCCH candidates for the current search space under consideration and all previously kept PDCCH candidates for previously considered (i.e. higher priority) search spaces Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method implemented by a wireless transmit/receive unit (WTRU), the method comprising:
   receiving configuration information indicating a plurality of search spaces, the configuration information indicating a respective number of physical downlink control channel (PDCCH) candidates associated with each respective search space of the plurality of search spaces, wherein the configuration information indicates that a first search space of the plurality of search spaces is associated with a set of PDCCH candidates;
   determining a maximum number of PDCCH candidates to monitor in a group, wherein the group comprises one or more slots or one or more symbols;
   determining to monitor a subset of the set PDCCH candidates in the group based on:
   a total number of configured PDCCH candidates associated with search spaces that the WTRU is configured to use for PDCCH monitoring in the group exceeding the maximum number of PDCCH candidates to monitor in the group, and
   the first search space corresponding to a first type of search space; and
   monitoring for at least one PDCCH transmission in the group using at least the subset of PDCCH candidates associated with the first search space.

2. The method of claim 1, wherein the group comprises a plurality of slots or a plurality of symbols.

3. The method of claim 1, further comprising:
   determining to monitor the subset of the set PDCCH candidates using the first search space in the group based on an index associated with each PDCCH candidate of the subset of the set of PDCCH candidates.

4. The method of claim 1, further comprising:
   determining to monitor the subset of the set PDCCH candidates using the first search space in the group based on a number of configured and active component carriers.

5. The method of claim 1, wherein the maximum number of PDCCH candidates to monitor in the group is determined based on a subcarrier size (SCS).

6. The method of claim 1, wherein the first type of search space corresponds to a WTRU specific search space or a common search space.

7. The method of claim 1, wherein the subset of PDCCH candidates to be monitored is determined based on a priority associated with the first search space.

8. The method of claim 1, wherein the method further comprises:
   receiving the at least one PDCCH transmission via at least one of the PDCCH candidates associated with the search spaces that the WTRU is configured to use for PDCCH monitoring in the group.

9. A wireless transmit/receive unit (WTRU) comprising a processor and memory, the processor and memory configured to:
   receive configuration information indicating a plurality of search spaces, the configuration information indicating a respective number of physical downlink control channel (PDCCH) candidates associated with each respective search space of the plurality of search spaces, wherein the configuration information indicates that a first search space of the plurality of search spaces is associated with a set of PDCCH candidates;
determine a maximum number of PDCCH candidates to monitor in a group, wherein the group comprises one or more slots or one or more symbols;
determine to monitor a subset of the set of PDCCH candidates using the first search space in the group based on:
a total number of configured PDCCH candidates associated with search spaces that the WTRU is configured to use for PDCCH monitoring in the group exceeding the maximum number of PDCCH candidates to monitor in the group, and
the first search space corresponding to a first type of search space; and
monitor for at least one PDCCH transmission in the group using at least the subset of PDCCH candidates associated with the first search space.

10. The WTRU of claim 9, wherein the group comprises a plurality of slots or a plurality of symbols.

11. The WTRU of claim 9, the processor further configured to:
determine to monitor the subset of the set PDCCH candidates using the first search space in the group based on an index associated with each PDCCH candidate of the subset of the set of PDCCH candidates.

12. The WTRU of claim 9, the processor further configured to:
determine to monitor the subset of the set PDCCH candidates using the first search space in the group based on a number of configured and active component carriers.

13. The WTRU of claim 9, wherein the maximum number of PDCCH candidates to monitor in the group is determined based on a subcarrier size (SCS).

14. The WTRU of claim 9, wherein the first type of search space corresponds to a WTRU specific search space or a common search space.

15. The WTRU of claim 9, wherein the processor and memory are configured to determine to monitor a subset of the set of PDCCH candidates using the first search space in the group based on a priority associated with the first search space.

16. The WTRU of claim 9, wherein the processor and memory are further configured to:
receive the at least one PDCCH transmission via at least one of the PDCCH candidates associated with the search spaces that the WTRU is configured to use for PDCCH monitoring in the group.

17. A wireless transmit/receive unit (WTRU) comprising a processor and memory, the processor and memory configured to:
receive configuration information indicating a plurality of search spaces, the configuration information indicating that a first search space of the plurality of search spaces is associated with a first number of PDCCH candidates and that a second search space of the plurality of search spaces is associated with a second number of PDCCH candidates;
determine a maximum number of PDCCH candidates to monitor in a group, wherein the group comprises one or more slots or one or more symbols;
determine to monitor the first number of PDCCH candidates in the group and to monitor a third number of PDCCH candidates using the second search space in the group based on a total number of configured PDCCH candidates in the group exceeding the maximum number of PDCCH candidates to monitor in the group, wherein the second number of PDCCH candidates is reduced to the third number of PDCCH candidates for the second search space in the group based on the second search space corresponding to a first type of search space; and
monitor at least one PDCCH transmission in the group via at least one of the search spaces monitored in the group.

18. The WTRU of claim 17, wherein a set of PDCCH candidates indicated in the configuration information is monitored based on the first search space corresponding to a second type of search space.

19. The WTRU of claim 17, wherein the group comprises a plurality of slots or a plurality of symbols.

20. The WTRU of claim 17, wherein the processor and memory are configured to determine which PDCCH candidates correspond to the third number of PDCCH candidates based on PDCCH candidate indices.

* * * * *